Patented Sept. 2, 1941

2,254,354

UNITED STATES PATENT OFFICE 2,254,354

ORGANIC COMPOUND

John Stanley Herbert Davies, Blackley, Manchester, England, assignor to Imperial Chemical Industries Limited, a corporation of Great Britain No Drawing. Application July 26, 1939, Serial No. 286,584. In Great Britain August 2, 1938

11 Claims. (Cl. 260—310)

This invention relates to new organic compounds, and to a process for their manufacture. More particularly, this invention deals with the preparation of novel β-isoindigo derivatives, which may be represented generically by the formula $$\begin{array}{c} R-C=\!=\!C-R \\ | \quad\quad | \\ A=C-NH\ HN-C=A \end{array} \quad (I)$$

In this formula, R, R are aromatic radicals of the benzene or naphthalene series to which the C, C atoms of the heterocyclic rings are attached in adjacent positions, while A, A represent the radicals of compounds which are wholly or partly cyclic and which include the atomic grouping —CH₂.CO— in the cyclic structure.

When R is phenylene, a subgroup of compounds results having the general formula

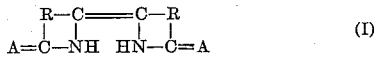

(2)

wherein A, A has the same significance as above. This subgroup may be designated generically as 1, 1'-derivatives of 3, 3'-bis-isoindolenylidene, the name being derived from the simple compound indole by the following hypothetical metamorphosis:

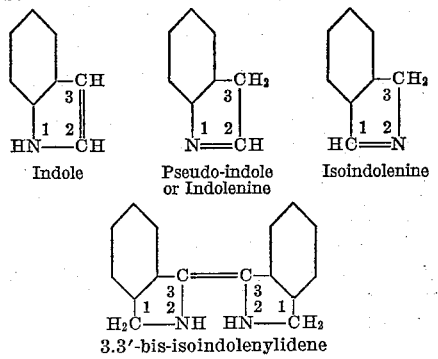

3,3'-bis-isoindolenylidene

It is an object of this invention to provide new organic compounds having, variously, utility as intermediates for the synthesis of dyestuffs, as pigments, and in the arts of dyeing textiles and of making lakes. It is a further object of this invention to provide processes for obtaining such compounds. Other and further important objects of this invention will appear as the description proceeds.

The manner in which we accomplish the aforegoing objects will now be apparent from the following description.

In copending application, Serial No. 272,056, filed May 5th, 1939, by Drew and Kelly, and in the corresponding British Patent No. 516,342 and French Patent No. 853,624, novel organic compounds are described which are obtained by treating an o-dinitrile of the benzene or naphthalene series with hydrogen sulphide in the presence of an alkaline catalyst, for instance ammonia. The aryl radical of the initial o-dinitrile may carry simple substituents, such as chloro atoms or methyl, nitro or amino groups. A similiar series of compounds, obtained by an analogous process, is described in copending application of Hanford, Serial No. 230,146, filed September 15th, 1938, and issued April 23, 1940, as U. S. Patent No. 2,198,166. From their reactions, these new compounds appear to be tautomeric, the tautomeric forms being represented by the two general formulae I and II below.

I

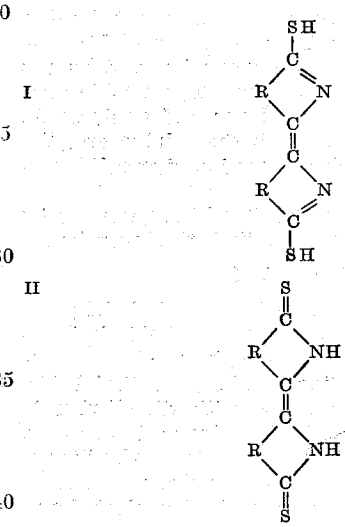

II wherein R, R stand for phenylene or naphthylene radicals, which may carry simple substituents, such as chloro atoms or methyl, nitro or amino groups, but in which the two C atoms of the heterocyclic ring are attached in adjacent positions. For distinction, form I will hereinafter be referred to as 1, 1'-dimercapto-, while form II will be referred to as 1, 1'-dithione derivatives.

We have now found that valuable new coloured compounds may be obtained by treating the compounds of the above mentioned copending applications, or their mono- or di-alkyl or -aralkyl ethers, with organic compounds which are cyclic and which include the atomic grouping —$CH_2.CO$— in the cyclic structure.

Pyrazolones, thioindoxyls, and certain naphthols and phenols, namely those which are capable of reacting as ketones are preferred groups of compounds defined above as having the atomic grouping —$CH_2.CO$—.

The treatment appears to effect replacement of either one or both mercapto or alkylmercapto substituents by radicals of the compounds containing —$CH_2.CO$—. Probably in some or all cases condensation is effected in either of two ways, which may be represented in diagrammatic ways as follows:

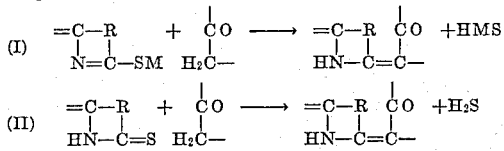

where M stands for hydrogen or alkyl.

The condensation is conveniently effected by heating the reactants together, preferably in a suitable liquid such as dimethylaniline or technical monochloronaphthalene. In most cases condensation takes place quickly and easily and good yields of the condensation products are obtained.

We have also found that such of the new condensation products, as are obtained from those starting materials containing —$CH_2.CO$— grouping which also contain aryl radicals or other nuclei which can be sulphonated, can be converted to further new compounds, which are water soluble by sulphonation.

Sulphonation can be conveniently effected by treating with a sulphonating acid, e. g., concentrated sulphuric acid, or oleum, if necessary, at a raised temperature.

The compounds which are obtained by the process of this invention are mostly highly coloured. The insoluble ones can be used as vat dyestuffs or as pigment ones. The soluble ones can be used as bases for lakes and as dyestuffs for wool and cotton. Both the soluble and the insoluble ones can also be used as dyestuff intermediates.

The following examples, in which parts are by weight, illustrate but do not limit the invention.

*Example 1*

A mixture of 5.8 parts of α-naphthol, 3.2 parts of 1:1'-di-(methylmercapto) 3:3'-bis-isoindolenylidene (made by treating the product of Example 1 of copending application Serial No. 272,056, above referred to, with dimethyl sulphate and alkali, i. e., methylating both mercapto substituents) and 22.5 parts of dimethylaniline is boiled for 10 minutes, allowed to cool and filtered. The filter-paste is washed with ethyl alcohol and dried.

The dry product, which is fast to light, dissolves in concentrated sulphuric acid with a blue colour. It dissolves in aqueous alkaline hydrosulphite solution with a bluish-red colour and the solution dyes cotton in greenish-blue shades. It does not melt below 300° C. The product corresponds in structure to Formula 2 above, wherein A represents the radical

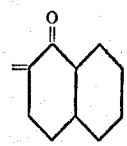

The same compound may be made from 1:1'-di-(ethylmercapto) bis-isoindolenylidine instead of from the dimethyl compound. The diethyl compound itself is made in a similar way to the dimethyl.

*Example 2*

5 parts of 1,1'-dimercapto-3,3'-bis-isoindolenylidene (prepared by passing hydrogen sulfide into a cooled alcoholic solution of phthalonitrile and ammonia; see Example 1 of British Patent No. 516,342) are heated with 25 parts of alpha-naphthol at 210 to 220° C. for about two hours and until evolution of hydrogen sulphide is practically complete. The mixture is cooled, the excess of alpha-naphthol is removed by means of ethyl alcohol and the residue is crystallised from chloronaphthalene. The product appears to be the same as that of Example 1.

*Example 3*

5 parts of the product of Example 1 are gradually stirred into 50 parts of 2% oleum at about 10–15° C. and stirring continued for about one hour at the same temperature. The solution is poured into 250 parts of ice-water, the mixture filtered, the filter-cake washed acid-free with 2% aqueous sodium cholride solution and dried.

The dry product, which appears to be a sulphonic acid of the compound formulated in Example 1, dissolves in water with a greenish-blue colour, and dyes wool in greenish-blue shades of very good fastness to light.

*Example 4*

4.32 parts of tetrachloro-1:1'-dimercapto-3:3'-bis-isoindolenylidene (as made in copending application Serial No. 272,056), 4.32 parts of alpha-naphthol and 30 parts of (technical) monochloronaphthalene are heated together at 250–270° C. for 1½ hours. Hydrogen sulphide is evolved and on cooling a deep bluish-green coloured solid separates. The mixture is diluted with 5–10 parts of benzene or light petroleum to facilitate filtration, and the solid filtered off, washed with benzene or petroleum and dried.

The dry product is similar to that of Example 2. It dissolves in concentrated sulphuric acid with a bluish-green colour and in pyridine with a deep green colour. It dyes cotton in green shades from a reddish-alkaline hydrosulphite vat.

*Example 5*

When 3.24 parts of diamino-1:1'-dimercapto-3:3'-bis-isoindolenylidene (as made in copending application Serial No. 272,056) are used instead of the tetrachloro-derivative in Example 4, a deep greenish-black coloured produce is obtained, which dissolves in concentrated sulphuric acid with a deep brown colour, in pyridine with a violet colour and in alkaline sodium hydrosulphite solution to give a cherry red coloured vat. It is probably a compound or mixture of compounds of the formula

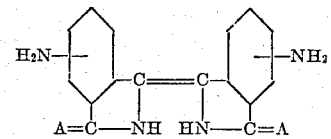

wherein A designates the radical

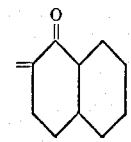

Example 6

The following table describes the condensation products obtained from resorcinol derivatives of alpha-naphthol and from diketotetrahydroquinolines when reacted with 1:1'-di-(methylmercapto) 3:3'-bis-isoindolylenylidene. It also describes the products obtained by sulphonating these compounds.

| | Starting material | Condensation products | | | Sulphonated products |
|---|---|---|---|---|---|
| | | Colour | Light fastness | Shade on cotton from alkaline hydrosulphite vat | Shade on wool |
| 1 | 4-chloro-1-naphthol | Blue-grey | Excellent | Green-blue | Bluish-green. |
| 2 | 5-methoxy-1-naphthol | Greenish-grey | do | Greenish-grey | Green. |
| 3 | 5-methylamino-α-naphthol | Greenish-black | | | |
| 4 | 5-β-hydroxy-ethylamino-1-naphthol | Grey | do | Grey | Grey. |
| 5 | 1:5-dihydroxy-naphthalene | do | Good | Greenish-grey | Bluish-green. |
| 6 | 1:8 dihydroxy-naphthalene | do | Excellent | Green | Green. |
| 7 | Resorcinol | Greyish-blue | do | Blue | Bluish-grey. |
| 8 | Bz-hydroxy-1,2-benzocarbazole | Greyish-violet | | Reddish-grey | Reddish-grey. |
| 9 | 2:4-diketo-1:2:3:4-tetrahydroquinoline | Violet | Excellent | Bluish-violet | |
| 10 | 1:3-diketo-1:2:3:4-tetrahydro-isoquinoline | Blue | Good | Blue | |
| 11 | 1:4-diketo-1:2:3:4-tetrahydro-isoquinoline | Greyish-blue | Excellent | Bluish-green | |

In all the above cases, the product has the general Formula 2 above, wherein A is in each case the bivalent radical of the corresponding starting compound named in the first column of the above table. Thus, in item 4, A represents the radical

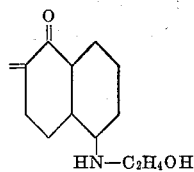

in item 8, the radical

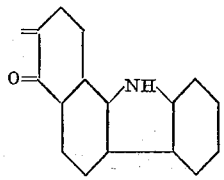

in item 9, the radical

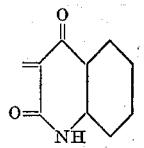

and in item 10, the radical

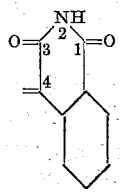

Example 7

A mixture of 7.9 parts of 2-hydroxy-3-naphthoic anilide, 3.2 parts of 1:1'-di-(methylmercapto) 3:3'-bis-isoindolenylidene and 30 parts of technical monochloronapthalene is heated at 260-280° C. for 1¼ hours. The mixture is cooled, diluted with 5-10 parts of benzene or light petroleum and filtered. The filter-paste is extracted with warm dilute sodium hydroxide solution to remove unchange 2-hydroxy-3-naphthoic anilide and dried.

The dry product is deep greenish-black in colour. It dissolves in concentrated sulphuric acid with a greenish-blue colour, in pyridine with a green colour, and in aqueous alkaline hydrosulphite with a reddish-brown colour. The latter solution dyes cotton in green shades.

Example 8

A mixture of 7.8 parts of 6-ethoxythioindoxyl, 3.2 parts of 1:1'-di-(methylmercapto) 3:3'-bis-isoindolenylidene and 22.5 parts of dimethylaniline is boiled for a quarter of an hour, cooled and filtered. The filter-paste is washed with benzene, and dried.

The dry product is dark purple in colour. It dissolves in concentrated sulphuric acid with a blue colour and in aqueous alkaline hydrosulphite with a red colour. It is probably 1:1'-di-(ethoxythioindoxylidene) 3:3'-bis-isoindolinylidene, corresponding to Formula 2 above, wherein A designates the radical

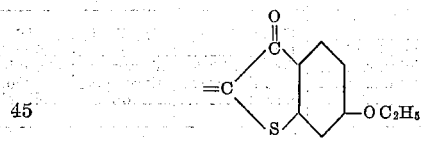

Example 9

5 parts of product of Example 8 are stirred into 50 parts of 100% sulphuric acid during a quarter of an hour at 10-15° C. Stirring is continued for three quarters of an hour longer and the mixture is then poured into 250 parts of ice-water and filtered. The filter-paste is washed acid-free with 10% aqueous sodium chloride solution and dried.

The dry product dissolves in water with a greenish blue colour.

Example 10

The compound of Example 8 can also be made by heating 2.94 parts of 1,1'-di-mercapto-3,3'-bis-isoindolenylidene (see Example 2 above) and 5.82 parts of 6-ethoxythioindoxyl in 30 parts of technical monochloronaphthalene at 250-270° C. for 8 hours. Hydrogen sulphide is evolved and on cooling the reaction mixture the product crystallises out. It is filtered, washed with petrol or benzene and dried.

Example 11

48 parts of 2:1-naphthathioindoxyl, 19.3 parts of 1:1'-di-(methylmercapto) 3:3'-bis-isoindolenylidene and 100 parts of dimethylaniline are boiled with stirring for 1 hour, allowed to cool and filtered. The precipitate is washed with benzene and dried. Excess naphthathioindoxyl is removed by extracting with hot dimethylaniline.

The dry product is blue and dyes cotton in green shades from an olive-green alkaline hydrosulphite vat. The structure of the product corresponds to Formula 2 above, but A here designates the radical

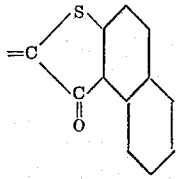

Example 12

5 parts of the product of Example 11 are added in portions with stirring to 50 parts of 10% oleum at about 20° C. The blue solution is stirred for a further hour and then poured into 400 parts of ice-water. The blue precipitate is filtered and washed acid-free with 10% salt solution and then dried.

The resulting sulphonic acid dissolves in water with a green colour and dyes wool in green shades.

Example 13

The following table shows the colour and light fastness of the compounds obtained from 1:1'-di-(methylmercapto) 3:3'-bis-isoindolenylidene and other thioindoxyls as mentioned in the first column, and also the colour of the dyeings on wool of the compounds obtained by sulphonating the condensation products.

| Thioindoxyl | Condensation product | | Sulphonated product |
|---|---|---|---|
| | Colour | Light fastness | Shade on wool and cotton |
| Thioindoxyl | Greenish-grey | Excellent | Bluish-green. |
| 5-chloro-7-methyl-thioindoxyl | Grey | do | Yellowish-green. |
| 6-chloro-4-methyl-thioindoxyl | Greyish-blue | Very good | Greenish-blue. |
| 1:2-naphtha-thioindoxyl | Reddish-grey | Excellent | Do. |
| 2:3-naphtha-thioindoxyl | Green | do | Yellowish-green. |

Example 14

A mixture of 3.2 parts of 1:1'-di-(methylmercapto)-3:3'-bis-isoindolenylidene, 5.9 parts of N-methyloxindole and 25 parts of dimethylaniline is boiled for 40 minutes, allowed to cool and stand for about half a day and then filtered. The filter-paste is washed with petrol ether (B. P. 80–100° C.) and dried.

The crude product is extracted with boiling benzene. The portion insoluble in benzene is then crystallised from boiling monochloronaphthalene. It forms glistening bronze needles. It has the constitution depicted by Formula 2 above, wherein A designates the radical

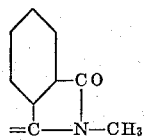

(Analyses.—Found C=78.7  H=5.0  N=10.4%
$C_{34}H_{24}O_2N_4$ requires C=78.47 H=4.62 N=10.76%)

The product soluble in hot benzene separates on cooling as a dark crystalline precipitate with a brownish sheen. It is purified by crystallising from hot solvent naphtha. When it is finely divided, its colour is purple. It has the constitution:

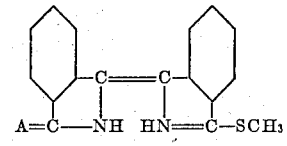

wherein A has the same significance as above in this example.

(Analyses.—Found C=75.3; H=4.8;
N=9.6; S=7.2%
$C_{26}H_{19}ON_3S$ requires C=74.1; H=4.5;
N=9.9; S=7.6%)

Example 15

A mixture of 7 parts of 1-phenyl-3-methyl-5-pyrazolone, 3.2 parts of 1:1'-di-(methylmercapto) 3:3'-bis-isoindolenylidine and 22.5 parts of dimethylaniline is boiled for 10–15 minutes, and filtered. The filter-paste is extracted with benzene to remove excess of the phenylmethylpyrazolone.

The product forms small glistening crystals with a voilet sheen and does not melt below 300° C. It dissolves in concentrated sulphuric acid with a crimson colour and in aqueous alkaline hydrosulphite with a reddish-brown colour. It dyes cotton violet shades. It is believed to be di-(phenylmethyl pyrazolonylidene) 3:3'-bis-iso indolinyledene.

The structural formula therefore may be represented by Formula 2 above, wherein A designates the 4,4-bivalent radical of 1-phenyl-3-methyl-5-pyrazolone, in other words the radical

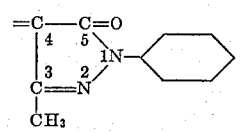

(Analyses.—Found C=75.2  H=4.6  N=14.0
$C_{36}H_{26}O_2N_6$ requires C=75.26 H=4.53 N=14.63%)

Instead of 1:1'-di-(methylmercapto) 3:3'-bis-isoindolenylidene, the corresponding dipropyl compound may be used as a starting material. Also the dimercapto compound itself may be used.

Example 16

5 parts of the product of Example 15 are stirred into 50 parts of 2% oleum at 10–15° C. and stirring continued at this temperature for 10 hours, the temperature is then raised to 60° C. and kept at this for 1½ hours. The solution is poured into 250 parts of ice-water and the precipitate obtained is filtered off and dried.

Example 17

9 parts of 1-(4'-nitro) phenyl-3-methyl-5-pyrazolone, 6.4 parts of 1:1'-di-(methylmercapto)

3:3'-bis-isoindolenylidene and 50 parts of dimethylaniline are boiled together for about half an hour, allowed to cool and filtered. The precipitate is again boiled with dimethylaniline and filtered hot. After cooling, the precipitate is washed with petrol ether. When in a finely divided condition, it is bluish-black in shade. It dissolves in aqueous alkaline hydrosulphite with a yellow-brown colour, and a reddish-blue precipitate is formed when the solution is aerated.

*Example 18*

24 parts of rhodanine

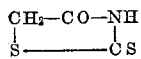

19.3 parts of 1:1'-di(methylmercapto) 3:3'-bis-isoindolenylidene and 100 parts of dimethylaniline are boiled together for ½–¾ hour. The mixture is filtered hot and the precipitate, when cooled, is washed with ethyl alcohol. It is then again boiled with dimethylaniline and then with acetone to remove any impurity and excess rhodanine. After washing with alcohol, filtering and drying, a violet solid remains. The structure of the product corresponds to Formula 2 above, but A here designates the radical

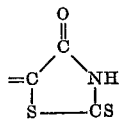

I claim:

1. A compound of the formula

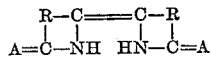

wherein R and R are aromatic radicals having not more than 10 carbon atoms in their cyclic configuration, the C, C atoms of the rings

above shown being attached to said aromatic radicals in adjacent positions, while A, A represent the radicals of compounds which contain at least one closed ring in their structure and which include one of the tautomeric groupings —CH$_2$.CO— and —CH=C(OH)— in the said closed ring.

2. A compound of the formula

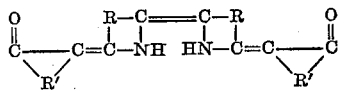

wherein R and R are aromatic radicals having not more than 10 carbon atoms in their cyclic configuration, the C, C atoms of the rings

above shown being attached to said aromatic radicals in adjacent positions, while the groups

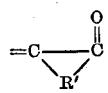

represent each, the radical of a heterocyclic component.

3. A compound of the formula

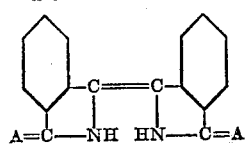

wherein A represents the divalent radical of a pyrazolone compound.

4. A compound of the formula—

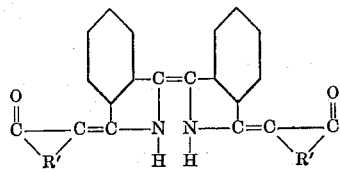

wherein

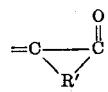

represents the radical of a heterocyclic ring system.

5. The process of producing organic compounds which comprises reacting a compound selected from the group consisting of 3:3'-dithio-bis-isoindolenylidene, 3:3'-dimercapto-bis-isoindolenylidene and the alkyl thioethers derivable therefrom with cyclic compounds containing one of the tautomeric groupings —CH$_2$.CO— and

—CH=C(OH)

in the cyclic structure.

6. A process as claimed in claim 5, wherein the cyclic compound is a thioindoxyl.

7. A process as claimed in claim 5, wherein the cyclic compound is a pyrazolone.

8. A process as claimed in claim 5, wherein the cyclic compound is an alpha-naphthol.

9. A compound of the formula

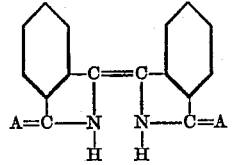

wherein A represents the divalent radical of a tautomerized alpha-naphthol.

10. A compound of the formula

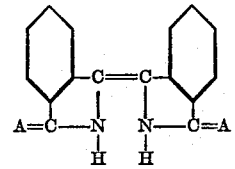

wherein A represents the divalent radical of a phenyl-methyl-pyrazolone.

11. A compound of the formula

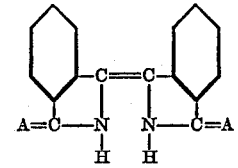

wherein A represents the divalent radical of a thioindoxyl.

JOHN STANLEY HERBERT DAVIES.